（12） United States Patent
Ushigami

(10) Patent No.: US 8,429,324 B2
(45) Date of Patent: Apr. 23, 2013

(54) BUS-PROTOCOL CONVERTING DEVICE AND BUS-PROTOCOL CONVERTING METHOD

(75) Inventor: Shinji Ushigami, Kanagawa (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 12/879,293

(22) Filed: Sep. 10, 2010

(65) Prior Publication Data

US 2011/0078349 A1 Mar. 31, 2011

(30) Foreign Application Priority Data

Sep. 28, 2009 (JP) ................. 2009-222843

(51) Int. Cl.
*G06F 13/14* (2006.01)
*G06F 13/28* (2006.01)
*G06F 9/34* (2006.01)

(52) U.S. Cl.
USPC ............ 710/315; 710/308; 710/22; 711/200; 711/202

(58) Field of Classification Search ............... 710/22, 710/52, 56, 57, 305–306, 308, 310–315; 711/200, 202, 203
See application file for complete search history.

(56) References Cited

U.S. PATENT DOCUMENTS

| | | | |
|---|---|---|---|
| 6,948,025 B2 | 9/2005 | Yoshida | |
| 7,069,350 B2 * | 6/2006 | Fujita et al. | ...................... 710/22 |
| 7,120,708 B2 * | 10/2006 | Futral et al. | ...................... 710/26 |
| 7,739,419 B2 * | 6/2010 | Matsuda | ........................... 710/5 |
| 8,010,730 B2 * | 8/2011 | Adachi | ......................... 710/306 |
| 8,051,216 B2 * | 11/2011 | Sivertsen | ......................... 710/11 |
| 8,117,372 B2 * | 2/2012 | Daniel et al. | ................... 710/315 |
| 2007/0016702 A1 * | 1/2007 | Pione et al. | ...................... 710/62 |

FOREIGN PATENT DOCUMENTS

| | | |
|---|---|---|
| JP | 10-161972 | 6/1998 |
| JP | 2003-223411 | 8/2003 |
| JP | 2007-172510 | 7/2007 |

\* cited by examiner

*Primary Examiner* — Paul R Myers
*Assistant Examiner* — Trisha Vu
(74) *Attorney, Agent, or Firm* — Oblon, Spivak, McClelland, Maier & Neustadt, L.L.P.

(57) ABSTRACT

A bus-protocol converting device includes: a command detecting unit that detects a command sent from an external-memory control device, connected to a primary bus, to a primary bus interface controller; a command converting unit that converts the detected command into a command to be sent from a secondary bus interface controller to an external memory device through a secondary bus; a status detecting unit that detects a status sent from the external memory device; a status converting unit that converts the detected status into a status to be sent from the primary-bus interface controller to the external-memory control device through the primary bus; and a data transfer controller that is provided between the primary bus interface controller and the secondary bus interface controller to perform data transfer between the external-memory control device and the external memory device through a DMA bus.

7 Claims, 9 Drawing Sheets

FIG. 7A

RESPONSE DATA FOR READ CAPACITY COMMAND

| | Bit 7 | Bit 6 | Bit 5 | Bit 4 | Bit 3 | Bit 2 | Bit 1 | Bit 0 |
|---|---|---|---|---|---|---|---|---|
| 0 | (MSB) | | | | | | | |
| 1 | | | | LAST LOGICAL BLOCK ADDRESS | | | | |
| 2 | | | | | | | | |
| 3 | | | | | | | | (LSB) |
| 4 | (MSB) | | | | | | | |
| 5 | | | | BLOCK LENGTH BYTES | | | | |
| 6 | | | | | | | | |
| 7 | | | | | | | | (LSB) |

BLOCK LENGTH × (MAXIMUM LOGICAL BLOCK ADDRESS + 1) = MEMORY CAPACITY

FIG. 7B

READ (10) COMMAND

| | Bit 7 | Bit 6 | Bit 5 | Bit 4 | Bit 3 | Bit 2 | Bit 1 | Bit 0 |
|---|---|---|---|---|---|---|---|---|
| 0 | | | | Operation Code (28H) | | | | |
| 1 | | Lun (0) | | | | Reserved (0) | | |
| 2 | (MSB) | | | | | | | |
| 3 | | | | LOGICAL BLOCK ADDRESS | | | | |
| 4 | | | | | | | | |
| 5 | | | | | | | | (LSB) |
| 6 | | | | Reserved (0) | | | | |
| 7 | (MSB) | | | TRANSFER LENGTH | | | | |
| 8 | | | | | | | | (LSB) |
| 9 | | | | Reserved (0) | | | Flag (0) | Link (0) |

DATA CORRESPONDING TO SPECIFIED NUMBER OF BLOCKS IS TRANSFERRED FROM SPECIFIED LOGICAL BLOCK ADDRESS

FIG. 7C

WRITE (10) COMMAND

| | Bit 7 | Bit 6 | Bit 5 | Bit 4 | Bit 3 | Bit 2 | Bit 1 | Bit 0 |
|---|---|---|---|---|---|---|---|---|
| 0 | | | | Operation Code (2AH) | | | | |
| 1 | | Lun (0) | | | | Reserved (0) | | |
| 2 | (MSB) | | | | | | | |
| 3 | | | | LOGICAL BLOCK ADDRESS | | | | |
| 4 | | | | | | | | |
| 5 | | | | | | | | (LSB) |
| 6 | | | | Reserved (0) | | | | |
| 7 | (MSB) | | | TRANSFER LENGTH | | | | |
| 8 | | | | | | | | (LSB) |
| 9 | | | | Reserved (0) | | | Flag (0) | Link (0) |

DATA CORRESPONDING TO SPECIFIED NUMBER OF BLOCKS IS TRANSFERRED TO SPECIFIED LOGICAL BLOCK ADDRESS

BUS-PROTOCOL CONVERTING DEVICE AND BUS-PROTOCOL CONVERTING METHOD

BACKGROUND OF THE INVENTION

1. Field of the Invention

The present invention relates to a bus-protocol converting device and a bus-protocol converting method for a virtual memory bus master DMA system.

2. Description of the Related Art

SCSI (Small Computer System Interface), ATAPI (AT Attachment Packet Interface), USB (Universal Serial Bus) Mass Storage Class, IEEE (Institute of Electrical and Electronics Engineers) 1394 Serial Bus Protocol 2, and so on are available as storage bus standards. When an extension bus for a host device and a connection bus for a storage device are different from each other, they are connected with a bus-protocol converting device interposed therebetween.

A bus-protocol converting device having a FIFO (first-in first-out) memory and a DMA (direct memory access) controller is used in order to perform high-speed input/output of data between the devices connected to the buses having different standards.

For example, during conversion between a SCSI bus and an ATA-2 bus, data input/output is performed at high speed via a FIFO memory (e.g., refer to Japanese Unexamined Patent Application Publication No. 10-161972) and DMA (direct memory access) is performed between an IEEE 1394 bus and a SCSI bus in order to improve the performance of a data transfer operation (e.g., refer to Japanese Unexamined Patent Application Publication No. 2003-223411). In addition, a DMA transfer device that has FIFO and DMA between a primary bus and a secondary bus and that employs high-speed burst transfer has been proposed so as to achieve efficient data transfer (e.g., refer to Japanese Unexamined Patent Application Publication Nos. 2003-223411 and 2007-172510).

Data transfer using FIFO and DMA achieves high-speed burst transfer by performing DMA on addresses mapped in a contiguous address space.

Data access is executed by giving logical addresses with serial numbers (i.e., LBA: logical block addressing) to all minimum access units (i.e., units with a block length) of data and specifying a direction (read or write), a start LBA, and the number of blocks from an LBA by using command parameters.

A bus-protocol converting device incorporating a bus master DMA system is available to perform data transfer therein. In the bus master DMA system, a primary interface unit and a secondary interface unit transfer data by performing DMA access on a common memory for transfer and relay.

SUMMARY OF THE INVENTION

When the technology in which the FIFO is mapped into the contiguous address space and DMA burst transfer is performed is used, addition processing for a transfer source address or a transfer destination address is performed during burst transfer via an internal buffer. Thus, in order to transfer data from a transfer source address to a transfer destination address, DMA burst is performed twice, i.e., DMA burst from a transfer source address to an internal buffer and DMA burst from the internal buffer to a transfer destination address are performed. This arrangement, therefore, is not sufficient in order to reduce the occupancy rate of the DMA bus band.

In a burst-length selecting circuit that reports a maximum burst length on the basis of the number of data queues in a FIFO and a table of useable burst-length setting values, a burst-transfer command cycle for one command occurs more than the number of commands for a primary bus. Thus, it is not sufficient to reduce the occupancy rate of the DMA bus band.

That is, when the number of data transfer requests from the host device exceeds the common memory size, the bus-protocol converting device performs split transfer for DMA to transfer the entire amount of data. With this method, however, since the DMA operation of the bus-protocol converting device varies depending on the number of data requests from the host device, it is difficult to achieve a stabilized high-speed operation.

Accordingly, the present invention has been conceived in order to overcome the above-described problems, and it is desirable to eliminate, in a bus-protocol converting device that performs burst transfer, a data-transfer performance decline resulting from LBA-managed command execution performed by an external-memory control device.

Objects and specific advantages of the present invention will become more apparent from the following description of embodiments of the present invention.

According to the present invention, bus master DMA control that is independent of a common memory size is performed, a FIFO in an interface is assigned as a virtual memory, and a bus master DMA transfer in which the number of data requests from a host device is directly used is performed. That is, a FIFO (having a data capacity of, e.g., several kilobytes) included in an interface controller in the host device is used in a ring buffer and this ring buffer is assigned to a virtual memory (e.g., several gigabytes). The value of a data transfer size from the host computer is directly sent to an interface controller for a storage, a bus master DMA operation is performed once between the interface controller for the storage and the virtual memory, and bus-protocol-conversion data transfer is performed simultaneously with the execution of the bus master DMA operation.

One embodiment of the present invention provides a bus-protocol converting device. The bus-protocol converting device includes: a primary bus interface controller to which an external-memory control device is connected through a primary bus, the primary bus interface controller including a FIFO memory as a communication buffer; a secondary bus interface controller to which an external memory device is connected through a secondary bus; command detecting means for detecting a command sent from the external-memory control device, connected to the primary bus, to the primary bus interface controller; command converting means for converting the command detected by the command detecting means into a command to be sent from the secondary bus interface controller to the external memory device through the secondary bus; status detecting means for detecting a status sent from the external memory device connected to the secondary bus; status converting means for converting the status detected by the status detecting means into a status to be sent from the primary-bus interface controller to the external-memory control device through the primary bus; and a data transfer controller that is provided between the primary bus interface controller and the secondary bus interface controller to perform data transfer between the external-memory control device, connected to the primary bus, and the external memory device, connected to the secondary bus, through a DMA bus. The data transfer controller uses the FIFO memory in a ring buffer, assigns the ring buffer as a virtual memory, directly sends a value of a data transfer size from the external-memory control device to the secondary bus interface controller, executes a bus master DMA operation once between the secondary-bus interface controller and the virtual memory, and performs bus-protocol-conversion data transfer simultaneously with the execution of the bus master DMA operation.

The primary bus interface controller may include, as the communication buffer, a primary-bus reception FIFO memory and a primary-bus transmission FIFO memory. The secondary bus interface controller may include external-memory size obtaining means for obtaining a capacity of the external memory device connected through the secondary bus and storing the obtained capacity as an external memory size. The data transfer controller may include a bus slave interface unit that maps the primary-bus reception FIFO memory and the primary-bus transmission FIFO memory into the same contiguous address space independently from an address space of a CPU (central processing unit), that has a DMA address space having, as an upper-limit address, the external memory size stored in the external-memory-size obtaining means, and that transmits the external memory size to the external-memory control device via the primary-bus interface controller; and a bus master interface unit that obtains a transfer address and a transfer size from a secondary-bus command generating means included in the secondary-bus interface controller and that performs burst transfer between the secondary bus and the DMA bus.

The primary-bus interface controller may include a primary-bus reception FIFO memory and a primary-bus transmission FIFO memory. The secondary-bus interface controller may include a secondary-bus reception FIFO memory and a secondary-bus transmission FIFO memory as a communication buffer. The data transfer controller may include a bus slave interface unit that performs data transfer between the primary bus and the DMA bus and a bus master interface unit that performs burst transfer between the secondary bus and the DMA bus. Preferably, the bus slave interface unit detects a data-presence state from the primary-bus reception FIFO memory and issues a read-burst-transfer permitting request to the bus master interface unit, detects a data-absence state from the primary-bus reception FIFO memory and issues a read-burst-transfer stopping request to the bus master interface unit, detects a data-full state from the primary-bus transmission FIFO memory and issues a write-burst-transfer stopping request to the bus master interface unit, and detects a state other than the data full state from the primary-bus transmission FIFO memory and issues a write-burst-transfer permitting request to the bus master interface unit. Preferably, the bus master interface unit detects a data-presence state of the secondary-bus reception FIFO memory and a write-burst permitting request of the bus slave interface unit and executes write burst transfer, detects a data-absence state of the secondary-bus reception FIFO memory or a write-burst stopping request of the bus slave interface unit and stops the write burst transfer, detects a data-full state of the secondary-bus transmission FIFO memory or a read-burst stopping request of the bus slave interface unit and stops read burst transfer, and detects a state other than the data full state of the secondary-bus transmission FIFO memory and a read-burst-transfer permitting request of the bus slave interface unit and executes the read burst transfer.

Another embodiment of the present invention provides a bus-protocol converting method. The method includes the steps of: causing command detecting means to detect a command sent from an external-memory control device, connected to a primary bus, to a primary-bus interface controller and causing command converting means to convert the detected command into a command to be sent from a secondary-bus interface controller to an external memory device through a secondary bus; causing status detecting means to detect a status sent from the external memory device connected to the secondary bus and causing status converting means to convert the detected status into a status to be sent from the primary-bus interface controller to the external-memory control device through the primary bus; using, when a data transfer controller that is provided between the primary-bus interface controller and the secondary-bus interface controller performs data transfer between the external-memory control device, connected to the primary bus, and the external memory device, connected to the secondary bus, through a DMA bus, a FIFO memory included as a communication buffer in the primary-bus interface controller, assigning the ring buffer as a virtual memory, directly sending a value of a data transfer size from the external-memory control device to the secondary bus interface controller, executing a bus master DMA operation once between the secondary-bus interface controller and the virtual memory, and performing bus-protocol-conversion data transfer simultaneously with the execution of the bus master DMA operation.

The bus-protocol converting method may further include the steps of: causing a bus slave interface unit that is included in the data transfer controller to map a primary-bus reception FIFO memory and a primary-bus transmission FIFO memory, included as the communication buffer in the primary-bus interface controller, into the same contiguous address space independently from an address space of a central processing unit, the bus slave interface unit having a DMA address space having, as an upper-limit address, an external memory size stored in external-memory-size obtaining means, and causing the bus slave interface unit to transmit the external memory size to the external-memory control device via the primary-bus interface controller; and causing a bus master interface unit included in the data transfer controller to obtain a transfer address and a transfer size from a secondary-bus command generating means included in the secondary-bus interface controller and to perform burst transfer between the secondary bus and the DMA bus.

The bus-protocol converting device may further include the steps of: causing a bus slave interface unit included in the data transfer controller to perform data transfer between the primary bus and the DMA bus and causing a bus master interface unit included in the data transfer controller to perform burst transfer between the secondary bus and the DMA bus; causing the bus slave interface unit to detect a data-presence state from the primary-bus reception FIFO memory included as the communication buffer in the primary-bus interface controller and issue a read-burst-transfer permitting request to the bus master interface unit, to detect a data-absence state from the primary-bus reception FIFO memory and issue a read-burst-transfer stopping request to the bus master interface unit, to detect a data-full state from the primary-bus transmission FIFO memory included in the communication buffer in the primary-bus interface controller and issue a write-burst-transfer stopping request to the bus master interface unit, and to detect a state other than the data full state from the primary-bus transmission FIFO memory and issue a write-burst-transfer permitting request to the bus master interface unit; and causing the bus master interface unit to detect a data-presence state of the secondary-bus reception FIFO memory included as a communication buffer in the secondary-bus interface controller and a write-burst permitting request of the bus slave interface unit and execute write burst transfer, to detect a data-absence state of the secondary-bus reception FIFO memory or a write-burst stopping request of the bus slave interface unit and stop the write burst transfer, to detect a data-full state of a secondary-bus transmission FIFO memory included as the communication buffer in the secondary-bus interface controller or a read-burst stopping request of the bus slave interface unit and stop read burst transfer, and to detect a state other than the data full state of the secondary-bus transmission FIFO memory and a read-burst-transfer permitting request of the bus slave interface unit and execute the read burst transfer.

According to the present invention, bus master DMA control that is independent of a common memory size is performed, a FIFO in an interface is assigned as a virtual memory, and a bus master DMA transfer in which the number of data requests from a host device is directly used is performed, thereby eliminating the restriction of the DMA transfer size. This makes it possible to achieve stabilized high-speed transfer by performing DMA access once. Thus, it is possible to eliminate the common memory to simplify the bus master control, thereby making it possible to realize power saving. In addition, it is possible to achieve a high-speed bus-protocol converting device without use of a large buffer memory.

Thus, according to the present invention, it is possible to improve the performance of a bus-protocol converting device without splitting for burst transfer during DMA transfer between a DMA bus, which executes commands received from a primary bus, and a secondary bus.

BRIEF DESCRIPTION OF THE DRAWINGS

FIGS. 7A to 7C illustrate SCSI/ATAPI commands;

DESCRIPTION OF THE PREFERRED EMBODIMENTS

Modes for carrying out the present invention will be described below in detail with reference to the accompanying drawings in accordance with the following sequence:
1. Overall Configuration (FIGS. 1 to 4);
2. Specific Operation of Bus-Protocol Converting Device (FIGS. 5 to 9); and
3. Function of Bus-Protocol Converting Device (FIG. 10).
<Overall Configuration>

Figure 1:
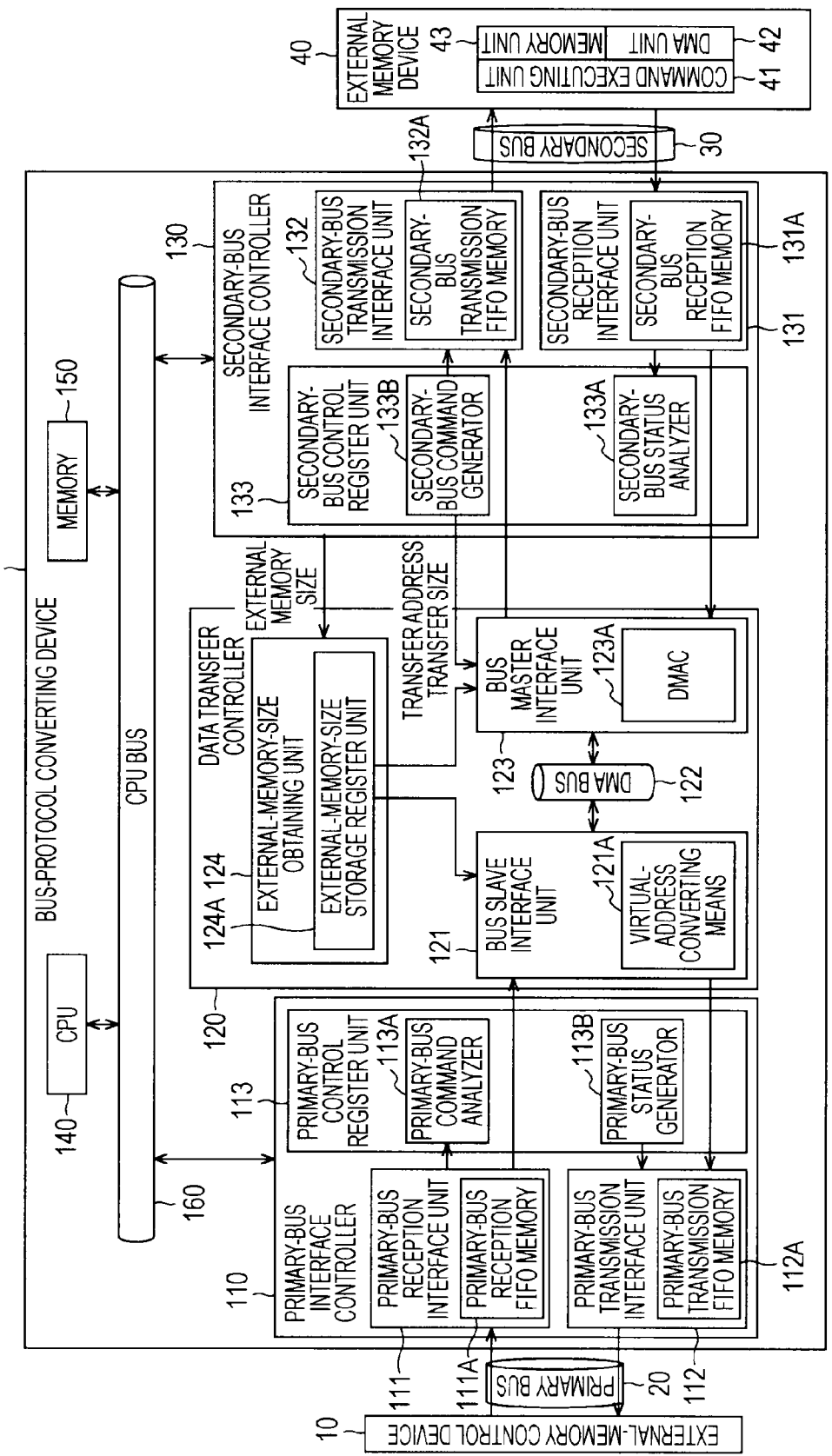
FIG. 1 is a block diagram showing the configuration of a bus-protocol converting device according to an embodiment of the present invention.

The present invention is applied to, for example, a bus-protocol converting device 100 having a configuration as shown in FIG. 1.

The bus-protocol converting device 100 includes a primary-bus interface controller 110, a data transfer controller 120, a secondary-bus interface controller 130, a CPU (central processing unit) 140 serving as a bus-master controller, a memory 150, and so on. The primary-bus interface controller 110, the secondary-bus interface controller 130, the CPU 140, and the memory 150 are connected to each other through a CPU bus 160.

An external-memory control device 10 is connected to the primary-bus interface controller 110 through a primary bus 20.

The external-memory control device 10 serves as a host device, such as a personal computer (PC), which can be externally connected using a host bus, such as a USB (universal serial bus), as the primary bus 20.

The primary-bus interface controller 110 includes a primary-bus reception interface unit 111, a primary-bus transmission interface unit 112, and a primary-bus control register unit 113. The primary-bus reception interface unit 111 includes a primary-bus reception FIFO (first-in first-out) memory 111A as a communication buffer. The primary-bus transmission interface unit 112 includes a primary-bus transmission FIFO memory 112A as a communication buffer. The primary-bus control register unit 113 includes a primary-bus command analyzer 113A and a primary-bus status generator 113B.

An external memory device 40 is connected to the secondary-bus interface controller 130 through a secondary bus 30 (e.g., a SATA [serial advanced technology attachment] bus).

The secondary-bus interface controller 130 includes a secondary-bus reception interface unit 131, a secondary-bus transmission interface unit 132, and a secondary-bus control register unit 133. The secondary-bus reception interface unit 131 includes a secondary-bus reception FIFO memory 131A as a communication buffer. The secondary-bus transmission interface unit 132 includes a secondary-bus transmission FIFO memory 132A as a communication buffer. The secondary-bus control register unit 133 includes a secondary-bus status analyzer 133A and a secondary-bus command generator 133B.

The external memory device 40 is a memory device, such as a hard disk or memory card, equipped with a bus-master DMA (direct memory access) function, and includes a command executing unit 41, a DMA unit 42, a memory unit 43, and so on.

The data transfer controller 120 is provided between the primary-bus interface controller 110 and the secondary-bus interface controller 130. The data transfer controller 120 includes a bus slave interface unit 121, a DMA bus 122, a bus master interface unit 123, and an external-memory-size obtaining unit 124.

The data transfer controller 120 performs data transfer between the external-memory control device 10, connected to the primary bus 20, and the external memory device 40, connected to the secondary bus 30, through the DMA bus 122.

More specifically, the bus slave interface unit 121 in the data transfer controller 120 performs data transfer between the primary bus 20 and the DMA bus 122. The bus master interface unit 123 performs burst transfer between the secondary bus 30 and the DMA bus 122.

The external-memory-size obtaining unit 124 includes an external-memory-size storage register unit 124A. The external-memory-size obtaining unit 124 obtains the capacity of the external memory device 40 connected to the secondary bus 30 and stores the obtained capacity in the external-memory-size storage register unit 124A as an external memory size.

Figure 2:
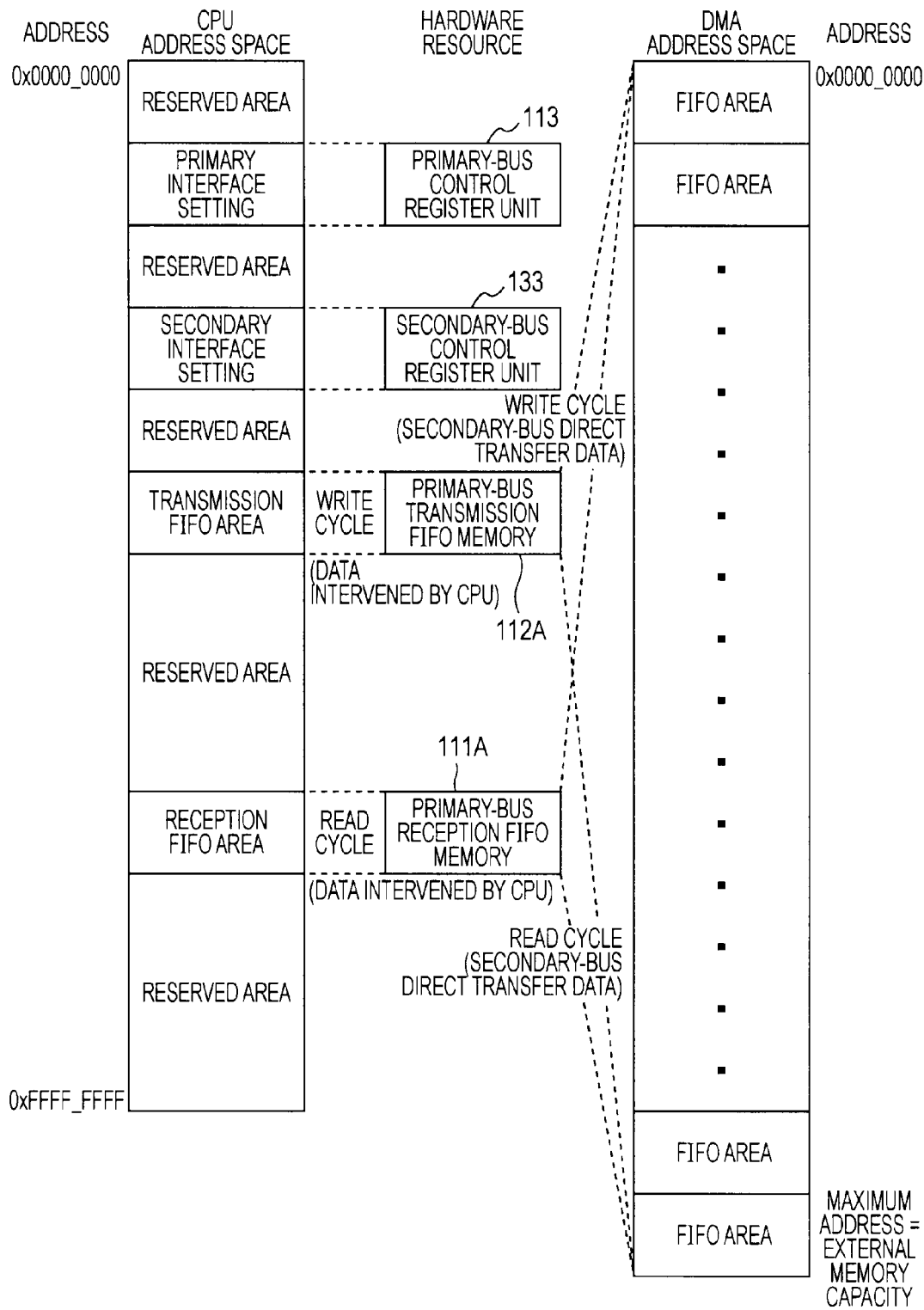
FIG. 2 shows a memory map for the bus-protocol converting device.

According to the bus-protocol converting device 100, as shown in a memory map shown in FIG. 2, the bus slave interface unit 121 maps the primary-bus reception FIFO memory 111A and the primary-bus transmission FIFO memory 112A into the same contiguous address space independently from the address space of the CPU 140; has a DMA address space having, as an upper-limit address, the external memory size stored in the external-memory-size storage register unit 124A in the external-memory-size obtaining unit 124; and transmits the external memory size to the external-memory control device 10 via the primary-bus interface controller 110.

The bus master interface unit 123 has a function of a DMAC (direct memory access controller) 123A. The bus master interface unit 123 obtains a transfer address and a transfer size from the secondary-bus command generator 133B included in the secondary-bus interface controller 130 and performs burst transfer between the secondary bus 30 and the DMA bus 122.

In the bus-protocol converting device 100, the bus slave interface unit 121 detects a "data-presence" state from the primary-bus reception FIFO memory 111A and issues a read-burst-transfer permitting request to the bus master interface unit 123. The bus slave interface unit 121 detects a "data-absence" state from the primary-bus reception FIFO memory 111A and issues a read-burst-transfer stopping request to the bus master interface unit 123. The bus slave interface unit 121 detects a "data-full" state from the primary-bus transmission FIFO memory 112A and issues a write-burst-transfer stopping request to the bus master interface unit 123. The bus slave interface unit 121 detects a state other than the "data-full" state from the primary-bus transmission FIFO memory 112A and issues a write-burst-transfer permitting request to the bus master interface unit 123.

The bus master interface unit 123 detects a "data-presence" state of the secondary-bus reception FIFO memory 131A and the write-burst permitting request of the bus slave interface unit 121 and executes write burst transfer, detects a "data-absence" state of the secondary-bus reception FIFO memory 131A or the write-burst stopping request of the bus slave interface unit 121 and stops the write burst transfer, detects a "data-full" state of the secondary-bus transmission FIFO memory 132A or the read-burst stopping request of the bus slave interface unit 121 and stops the read burst transfer, and further detects a state other than the "data-full" state of the secondary-bus transmission FIFO memory 132A and the read-burst-transfer permitting request of the bus slave interface unit 121 and executes read burst transfer.

Figure 3:
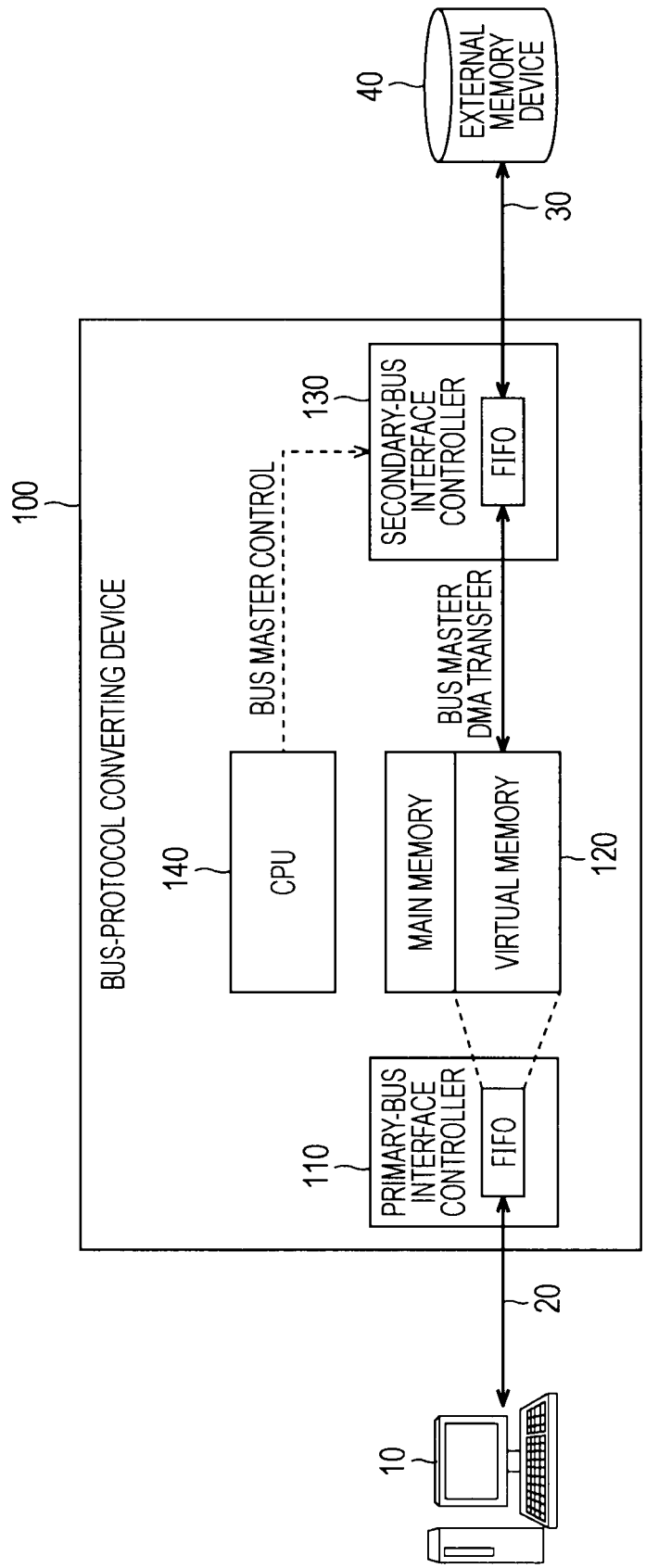
FIG. 3 is a diagram schematically illustrating a scheme for conversion into a virtual memory in the bus-protocol converting device.
Figure 4:
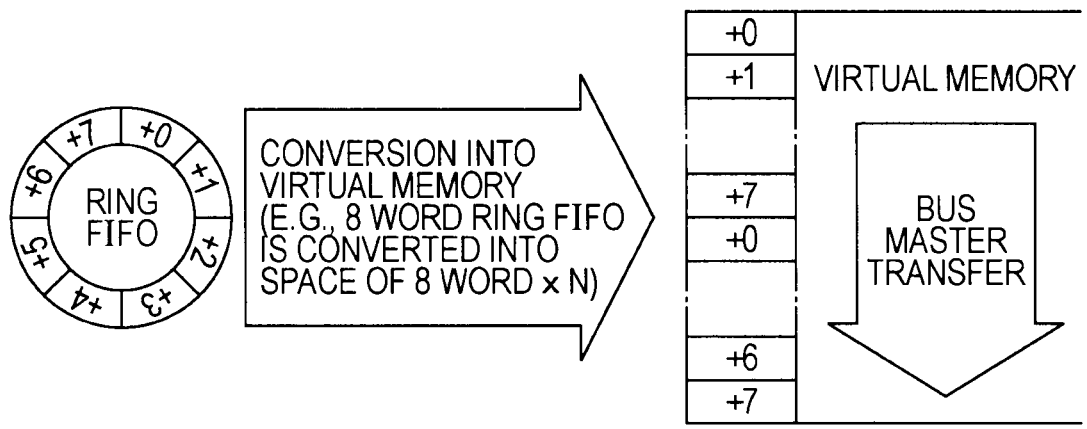
FIG. 4 is a conceptual diagram of the virtual memory in the bus-protocol converting device.
Figure 5:
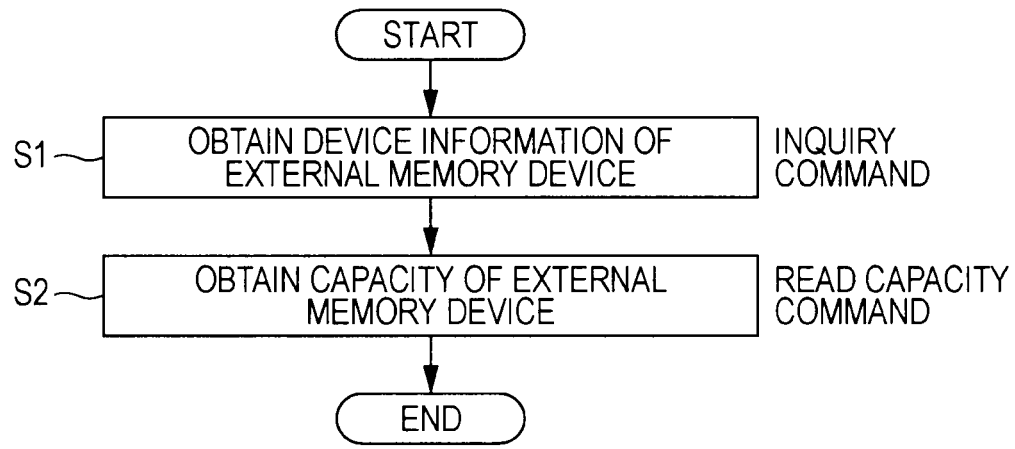
FIG. 5 is a flowchart showing an initialization sequence executed by the bus-protocol converting device.
Figure 6:
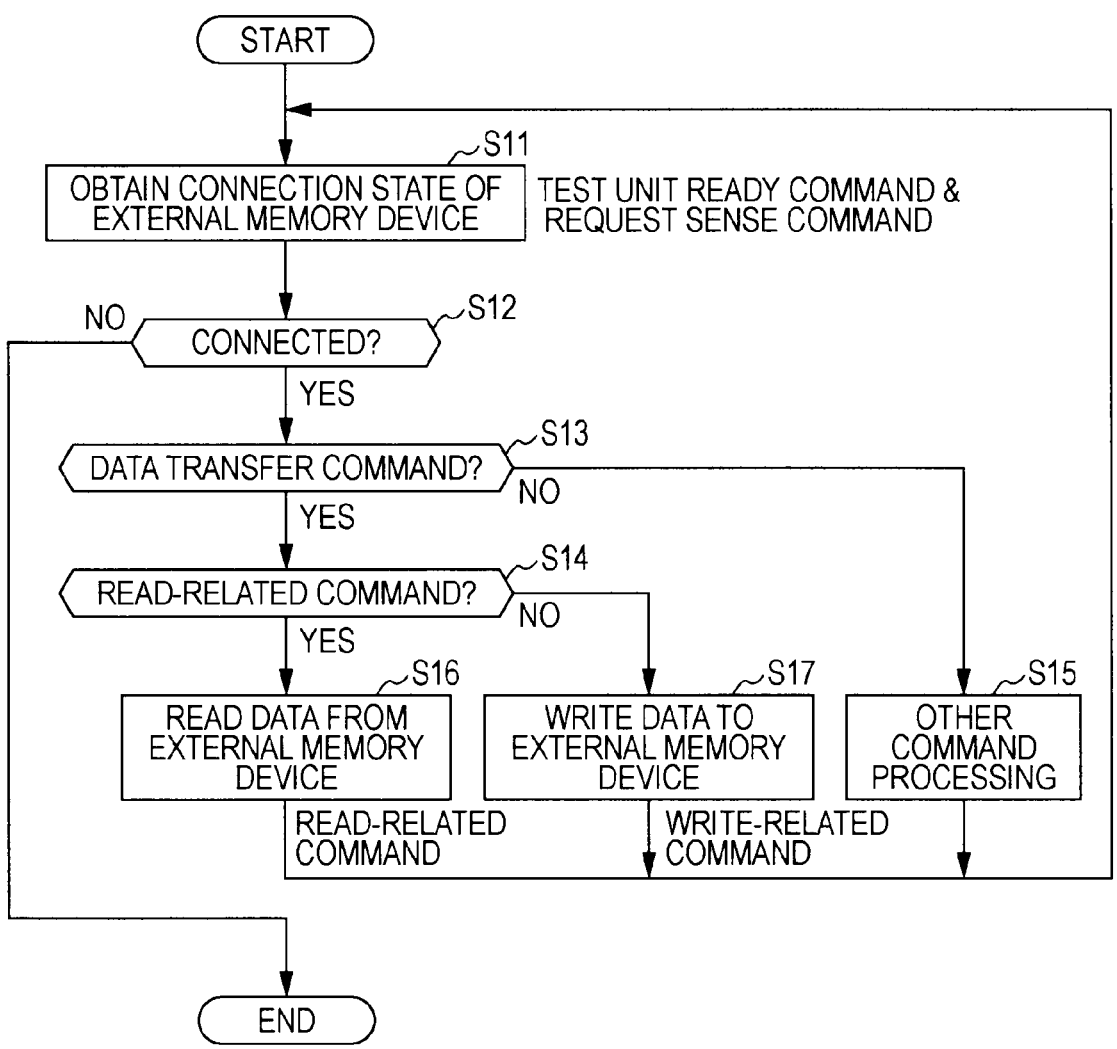
FIG. 6 is a flowchart showing a data sequence executed by the bus-protocol converting device.

As shown in FIGS. 3 and 4, the data transfer controller 120 uses the primary-bus reception FIFO memory 111A, included as the communication buffer in the primary-bus interface controller 110, in a ring buffer; assigns the ring buffer as a virtual memory; directly sends the value of the data transfer size from the external-memory control device 10 to the secondary-bus interface controller 130; executes a bus master DMA operation once between the secondary-bus interface controller 130 and the virtual memory, and performs bus-protocol conversion data transfer simultaneously with the execution of bus master DMA operation. The bus slave interface unit 121 serves as a virtual-address converting means 121A that uses the primary-bus reception FIFO memory 111A, included as the communication buffer in the primary-bus interface controller 110, in a ring buffer and assigns the ring buffer as a virtual memory.

<Specific Operation of Bus-Protocol Converting Device>

An operation of the bus-protocol converting device 100 will be described next. After performing processing for an initialization sequence (steps S1 and S2) shown in FIG. 5, the bus-protocol converting device 100 performs processing for a data sequence (steps S11 to S17) shown in FIG. 6.

In the initialization sequence, in step S1, the secondary-bus interface controller 130 in the bus-protocol converting device 100 issues an INQUIRY command for obtaining device information of the external memory device 40, to check the device information of the external memory device 40. In step S2, when the external memory device 40 to be operated is connected to the bus-protocol converting device 100, the bus-protocol converting device 100 issues a READ CAPACITY command for storage to the external memory device 40 to obtain external-memory information (a maximum LBA and a block length) and holds the contents of the external memory information in the external-memory-size storage register unit 124A included in the external-memory-size obtaining unit 124 in the data transfer controller 120.

As shown in FIG. 7A, response data for the READ CAPACITY command of SCSI/ATAPI commands contains a maximum logical block address (last logical block address) and a block length (block length bytes) as the external memory information. The memory capacity of the external memory device 40 can be determined by:

Memory Capacity=Block Length×(Maximum Logical Block Address+1).

When the external-memory control device 10 executes a command for checking the capacity of the external memory device 40, the data transfer controller 120 sends the contents of the external memory information, held in the external-memory-size storage register unit 124A, to the external-memory control device 10.

In the processing of the data sequence, in step S11, the secondary-bus interface controller 130 in the bus-protocol converting device 100 obtains information indicating a connection state of the external memory device 40 by issuing a TEST UNIT READY command and a REQUEST SENSE command.

Next, in step S12, on the basis of the obtained information indicating the connection state, the secondary-bus interface controller 130 determines whether or not the external memory device 40 is connected through the secondary bus 30.

When the result of the determination in step S12 is YES, i.e., when the external memory device 40 is connected, the process proceeds to step S13 in which the secondary-bus interface controller 130 determines whether or not a command for data transfer is received. When the result of the determination in step S12 is NO, i.e., when the external memory device 40 is not connected, the processing of the data sequence ends.

When the result of the determination in step S13 is YES, i.e., when a command for data transfer is received, the process proceeds to step S14 in which the secondary-bus interface controller 130 determines whether or not a read-related command is received. When the result of the determination in step S13 is NO, i.e., when no data transfer is performed, the process proceeds to step S15 in which the secondary-bus interface controller 130 performs command processing other than writing/reading data to/from the external memory device 40.

When the result of the determination in step S14 is YES, i.e., when a read-related command is received, the process proceeds to step S16 in which the secondary-bus interface controller 130 reads data from the external memory device

40. When the result of the determination in step S14 is NO, i.e., when a read-related command is not received, the process proceeds to step S17 in which the secondary-bus interface controller 130 writes data to the external memory device 40.

Figure 8:
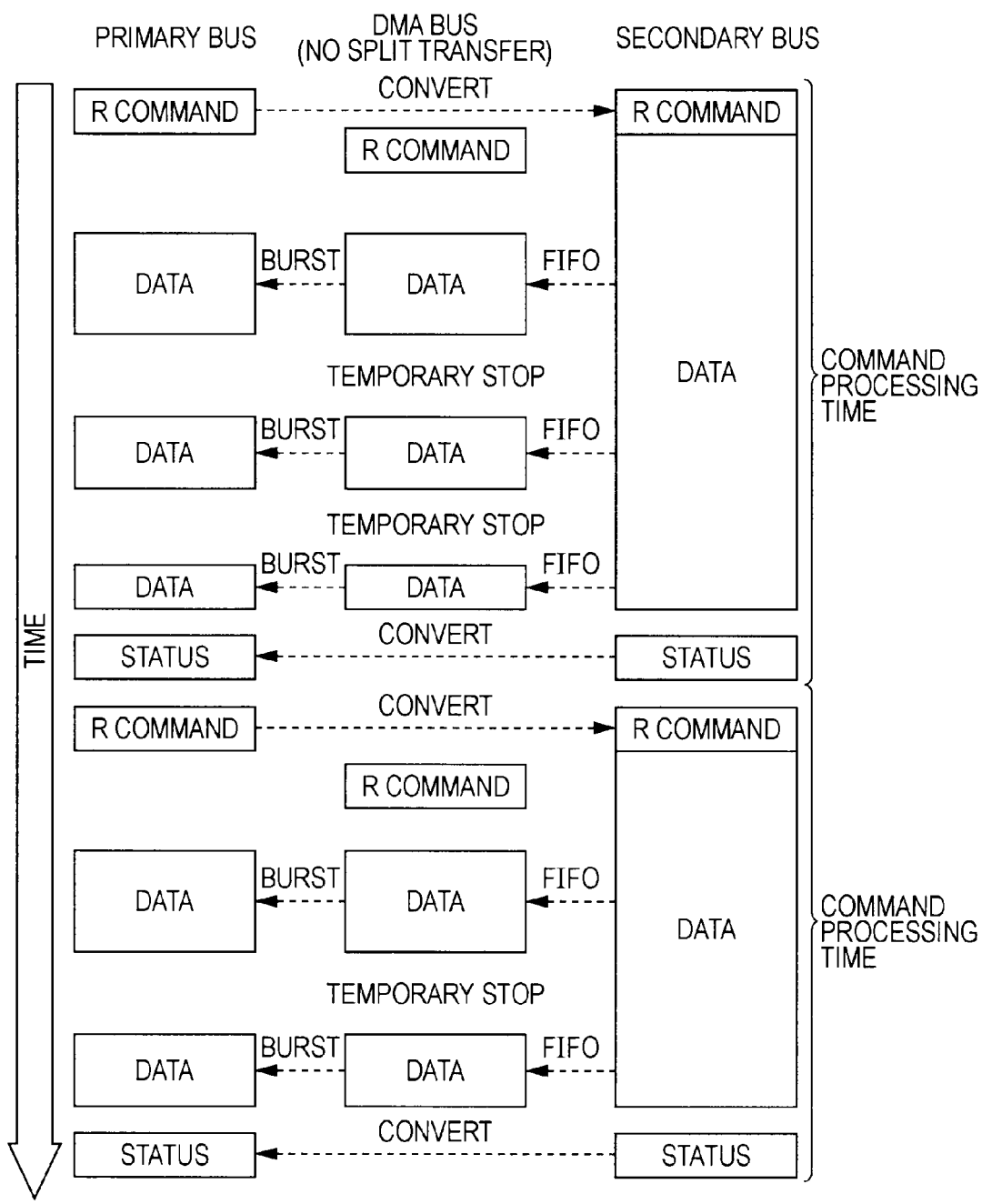
FIG. 8 is a diagram schematically illustrating one example of data read processing for a primary bus, the processing being executed by the bus-protocol converting device.

As shown in FIG. 8, the bus-protocol converting device 100 performs an operation for reading data from the external memory device 40 by using a read command READ (10) of the SCSI/ATAPI commands.

That is, the LBA of the read command READ (10) issued by the external-memory control device 10 and the number of transfer blocks are generally executed within the recognized capacity of the external memory device.

The read command READ (10) of the SCSI/ATAPI commands is a command for transferring, from a specified logical block address, data corresponding to a specified number of blocks. As shown in FIG. 7B, the read command READ (10) contains operation code (28H), a logical block address, and a transfer length.

Even when the command issued from the external-memory control device 10 exceeds the capacity of the external memory device 40, the bus-protocol converting device 100 can make an error response to the external-memory control device 10, since the bus-protocol converting device 100 recognizes the maximum capacity of the external memory device 40.

When the command received from the external-memory control device 10 is within the capacity of the external memory device 40, the secondary-bus command generator 133B included in the secondary-bus control register unit 133 in the secondary-bus interface controller 130 converts the command for the external memory device 40 and issues the converted command thereto.

At the same time, the secondary-bus command generator 133B reports the LBA of the command and the block length information to the bus master interface unit 123.

The bus master interface unit 123 executes, with the bus slave interface unit 121, DMA read burst transfer corresponding to the command, while checking conditions for starting/resuming and temporarily stopping the read burst transfer.

When a "not empty" state is detected from the primary-bus reception FIFO memory 111A included in the primary-bus reception interface unit 111 in the primary-bus interface controller 110 and the secondary-bus transmission FIFO memory 132A included in the secondary-bus transmission interface unit 132 in the secondary-bus interface controller 130 is in a "not full" state, the bus master interface unit 123 starts or resumes the read burst transfer.

When an "almost empty" state is detected from the primary-bus reception FIFO memory 111A included in the primary-bus reception interface unit 111 in the primary-bus interface controller 110 or the secondary-bus transmission FIFO memory 132A included in the secondary-bus transmission interface unit 132 in the secondary-bus interface controller 130 is in an "almost full" state, the bus master interface unit 123 temporarily stops the read burst transfer.

When the DMA read burst transfer is completed, the secondary-bus status analyzer 133A included in the secondary-bus control register unit 133 in the secondary-bus interface controller 130 recognizes a command completion status of the external memory device 40.

In addition, on the basis of a result of analysis performed by the secondary-bus status analyzer 133A in the secondary-bus interface controller 130, the primary-bus status generator 113B included in the primary-bus control register unit 113 in the primary-bus interface controller 110 notifies the external-memory control device 10 about status information indicating the command completion status.

Figure 9:
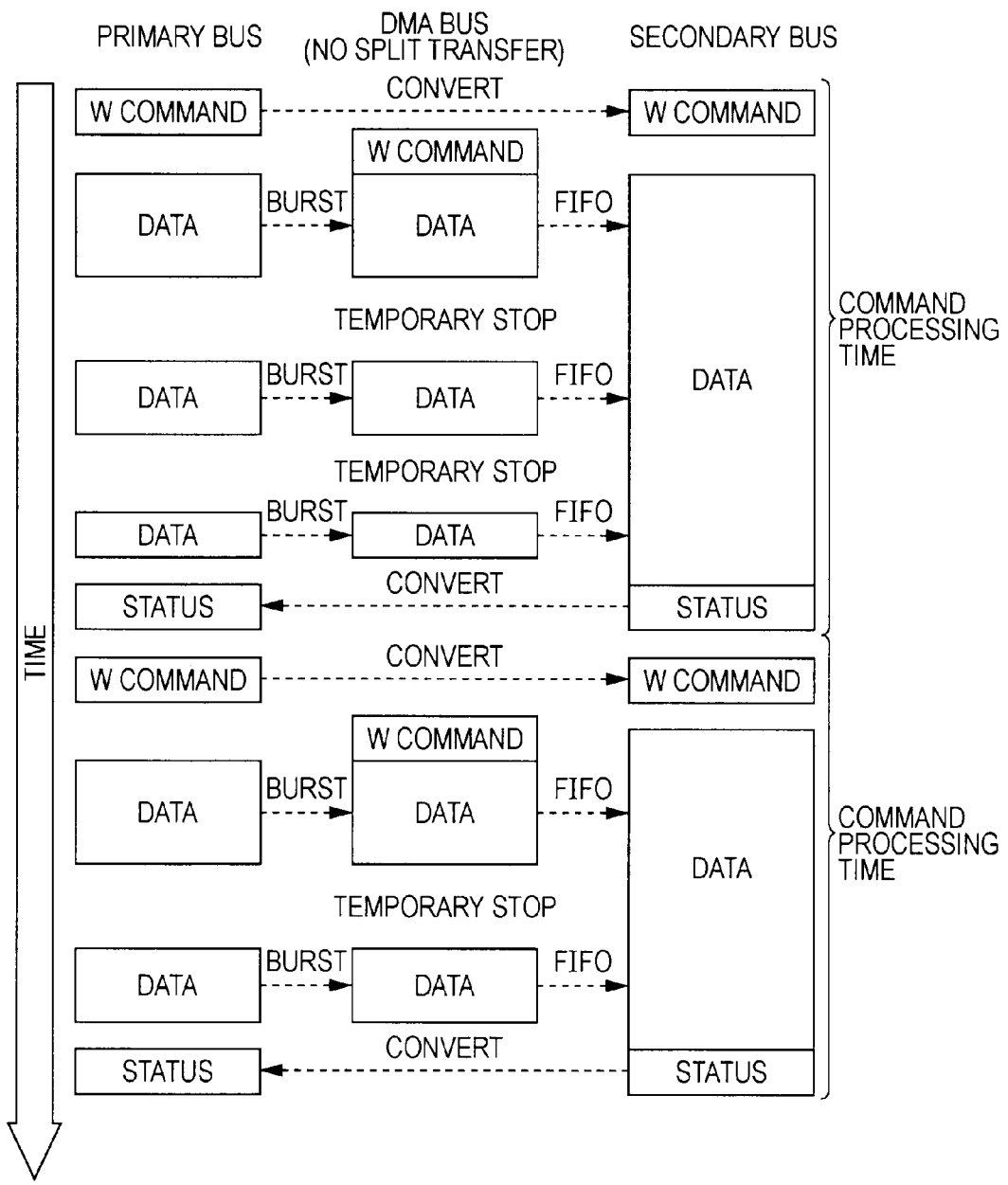
FIG. 9 is a diagram schematically illustrating one example of data write processing for the primary bus, the processing being executed by the bus-protocol converting device.

As shown in FIG. 9, the bus-protocol converting device 100 performs an operation for writing data to the external memory device 40 by using a write command WRITE (10) of the SCSI/ATAPI commands.

That is, the LBA of the write command WRITE (10) issued by the external-memory control device 10 and the number of transfer blocks are generally executed within the recognized capacity of the external memory device 40.

The write command WRITE (10) of the SCSI/ATAPI commands is a command for transferring, to a specified logical block address, data corresponding to a specified number of blocks. As shown in FIG. 7C, the write command WRITE (10) contains operation code (2AH), a logical block address, and a transfer length.

Even when the command issued from the external-memory control device 10 exceeds the capacity of the external memory device 40, the bus-protocol converting device 100 can make an error response to the external-memory control device 10, since the bus-protocol converting device 100 recognizes the maximum capacity of the external memory device 40.

When the command received from the external-memory control device 10 is within the capacity of the external memory device 40, the secondary-bus command generator 133B in the secondary-bus interface controller 130 converts the command for the external memory device 40 and issues the converted command thereto.

At the same time, the secondary-bus command generator 133B reports the LBA of the command and the block length information to the bus master interface unit 123.

The bus master interface unit 123 executes, with the bus slave interface unit 121, DMA write burst transfer corresponding to the command, while checking conditions for starting/resuming and temporarily stopping the write burst transfer.

When a "not full" state is detected from the primary-bus transmission FIFO memory 112A included in the primary-bus transmission interface unit 112 in the primary-bus interface controller 110 and the secondary-bus reception FIFO memory 131A included in the secondary-bus reception interface unit 131 in the secondary-bus interface controller 130 is in an "not empty" state, the bus master interface unit 123 starts or resumes the write burst transfer.

When an "almost full" state is detected from the primary-bus transmission FIFO memory 112A in the primary-bus interface controller 110 is detected or when the secondary-bus reception FIFO memory 131A in the secondary-bus interface controller 130 is in an "almost empty" state, the bus master interface unit 123 temporarily stops the write burst transfer.

When the DMA write burst transfer is completed, the secondary-bus status analyzer 133A included in the secondary-bus control register unit 133 in the secondary-bus interface controller 130 recognizes a command completion status of the external memory device 40.

In addition, on the basis of a result of analysis performed by the secondary-bus status analyzer 133A in the secondary-bus interface controller 133, the primary-bus status generator 113B included in the primary-bus control register unit 113 in the primary-bus interface controller 110 notifies the external-memory control device 10 about status information indicating the command completion status.

<Function of Bus-Protocol Converting Device>

Figure 10:
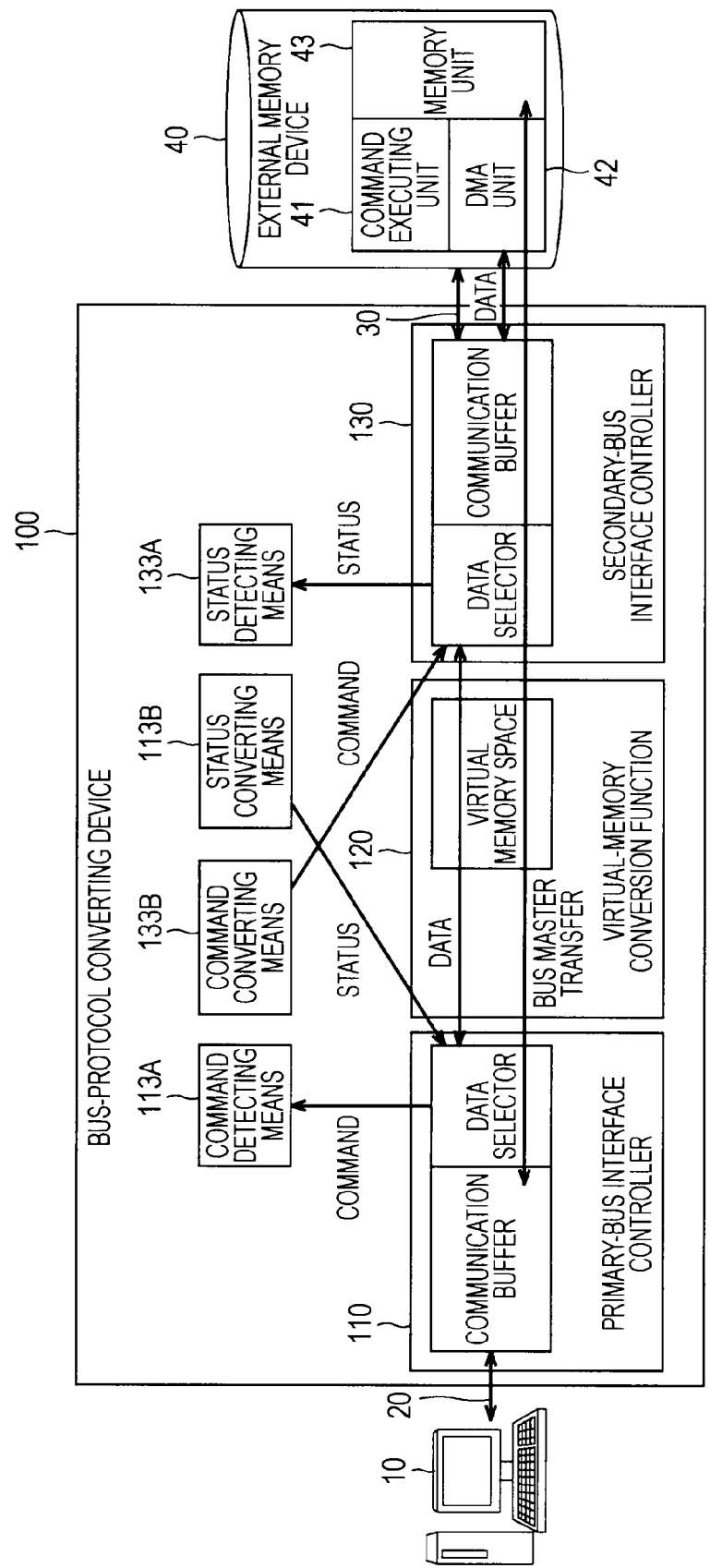
FIG. 10 is a diagram schematically illustrating a functional configuration of the bus-protocol converting device.

According to the bus-protocol converting device 100, as shown in FIG. 10 in which the functional configuration thereof is illustrated, the primary-bus command analyzer 113A included in the primary-bus control register unit 113 in the primary-bus interface controller 110 serves as command detecting means for detecting a command sent from the external-memory control device 10, connected to the primary bus 20, to the primary-bus interface controller 110. The secondary-bus command generator 133B included in the secondary-bus control register unit 133 in the secondary-bus interface controller 130 serves as command converting means for converting a command detected by the primary-bus command analyzer 113A into a command to be sent from the secondary-bus interface controller 130 to the external memory device 40 through the secondary bus 30.

The secondary-bus status analyzer 133A included in the secondary-bus control register unit 133 in the secondary-bus interface controller 130 serves as status detecting means for detecting a status sent from the external memory device 40 connected to the secondary bus 30.

The primary-bus status generator 113B included in the primary-bus control register unit 113 in the primary-bus interface controller 110 serves as status converting means for converting a status detected by the secondary-bus status analyzer 133A into a status to be sent from the primary-bus interface controller 110 to the external-memory control device 10 through the primary bus 20.

When the data transfer controller 120 provided between the primary-bus interface controller 110 and the secondary-bus interface controller 130 performs data transfer between the external-memory control device 10, connected to the primary bus 20, and the external memory device 40, connected to the secondary bus 30, through the DMA bus 122, the data transfer controller 120 uses the FIFO memory, included as the communication buffer in the primary-bus interface controller 110, in a ring buffer, assigns the ring buffer as a virtual memory, directly sends the value of the data transfer size from the external-memory control device 10 to the secondary-bus interface controller 130, executes a bus master DMA operation once between the secondary-bus interface controller 130 and the virtual memory, and performs bus-protocol-conversion data transfer simultaneously with the execution of the bus master DMA operation.

The data transfer controller 120 maps the primary-bus reception FIFO memory 111A and the primary-bus transmission FIFO memory 112A into the same contiguous address space independently from the address space of the CPU 140; has a DMA address space having, as an upper-limit address, the external memory size stored in the external-memory-size storage register unit 124A in the external-memory-size obtaining unit 124 serving as external-memory-size obtaining means; and transmits the external memory size to the external-memory control device 10 via the primary-bus interface controller 110. The bus master interface unit 123 obtains a transfer address and a transfer size from the secondary-bus command generator 133B included in the secondary-bus interface controller 130 and performs burst transfer between the secondary bus 30 and the DMA bus 122.

The data transfer controller 120 uses the bus slave interface unit 121 to perform data transfer between the primary bus 20 and the DMA bus 122 and uses the bus master interface unit 123 to perform burst transfer between the secondary bus 30 and the DMA bus 122. The bus slave interface unit 121 detects a "data-presence" state from the primary-bus reception FIFO memory 111A included as the communication buffer in the primary-bus interface controller 110 and issues a read-burst-transfer permitting request to the bus master interface unit 123. The bus slave interface unit 121 detects a "data-absence" state from the primary-bus reception FIFO memory 111A and issues a read-burst-transfer stopping request to the bus master interface unit 123. The bus slave interface unit 121 detects a "data-full" state from the primary-bus transmission FIFO memory 112A included as the communication buffer in the primary-bus interface controller 110 and issues a write-burst-transfer stopping request to the bus master interface unit 123. In addition, the bus slave interface unit 121 detects a state other than the "data-full" state from the primary-bus transmission FIFO memory 112A and issues a write-burst-transfer permitting request to the bus master interface unit 123. The bus master interface unit 123 detects a "data-presence" state of the secondary-bus reception FIFO memory 131A included as the communication buffer in the secondary-bus interface controller 130 and a write-burst permitting request of the bus slave interface unit 121 and executes write burst transfer. The bus master interface unit 123 detects a "data-absence state" of the secondary-bus reception FIFO memory 131A or a write-burst stopping request of the bus slave interface unit 121 and stops the write burst transfer. The bus master interface unit 123 detects a "data-full" state of the secondary-bus transmission FIFO memory 132A included as the communication buffer in the secondary-bus interface controller 130 or a read-burst stopping request of the bus slave interface unit 121 and stops the read burst transfer. The bus master interface unit 123 detects a state other than the "data-full" state of the secondary-bus transmission FIFO memory 132A and a read-burst-transfer permitting request of the bus slave interface unit 121 and executes read burst transfer.

The present application contains subject matter related to that disclosed in Japanese Priority Patent Application JP 2009-222843 filed in the Japan Patent Office on Sep. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A bus-protocol converting device comprising:
a primary bus interface controller to which an external-memory control device is connected through a primary bus, the primary bus interface controller including a first-in first-out memory as a communication buffer;
a secondary bus interface controller to which an external memory device is connected through a secondary bus;
command detecting means for detecting a command sent from the external-memory control device, connected to the primary bus, to the primary bus interface controller;
command converting means for converting the command detected by the command detecting means into a command to be sent from the secondary bus interface controller to the external memory device through the secondary bus;
status detecting means for detecting a status sent from the external memory device connected to the secondary bus;
status converting means for converting the status detected by the status detecting means into a status to be sent from the primary-bus interface controller to the external-memory control device through the primary bus; and
a data transfer controller that is provided between the primary bus interface controller and the secondary bus interface controller to perform data transfer between the external-memory control device, connected to the primary bus, and the external memory device, connected to the secondary bus, through a direct-memory-access bus;
wherein the data transfer controller uses the first-in first-out memory in a ring buffer, assigns the ring buffer as a virtual memory, directly sends a value of a data transfer size from the external-memory control device to the secondary bus interface controller, executes a bus master direct-memory-access operation once between the secondary-bus interface controller and the virtual memory, and performs bus-protocol-conversion data transfer simultaneously with the execution of the bus master direct-memory-access operation.

2. The bus-protocol converting device according to claim 1, wherein the primary bus interface controller includes, as the communication buffer, a primary-bus reception first-in first-out memory and a primary-bus transmission first-in first-out memory;

the secondary bus interface controller includes external-memory size obtaining means for obtaining a capacity of the external memory device connected through the secondary bus and storing the obtained capacity as an external memory size; and the data transfer controller includes
    a bus slave interface unit that maps the primary-bus reception first-in first-out memory and the primary-bus transmission first-in first-out memory into the same contiguous address space independently from an address space of a central processing unit, that has a direct-memory-access address space having, as an upper-limit address, the external memory size stored in the external-memory-size obtaining means, and that transmits the external memory size to the external-memory control device via the primary-bus interface controller, and
    a bus master interface unit that obtains a transfer address and a transfer size from a secondary-bus command generating means included in the secondary-bus interface controller and that performs burst transfer between the secondary bus and the direct-memory-access bus.

3. The bus-protocol converting device according to claim 1, wherein
    the primary-bus interface controller includes a primary-bus reception first-in first-out memory and a primary-bus transmission first-in first-out memory;
    the secondary-bus interface controller includes a secondary-bus reception first-in first-out memory and a secondary-bus transmission first-in first-out memory as a communication buffer;
    the data transfer controller includes a bus slave interface unit that performs data transfer between the primary bus and the direct-memory-access bus and a bus master interface unit that performs burst transfer between the secondary bus and the direct-memory-access bus;
    the bus slave interface unit detects a data-presence state from the primary-bus reception first-in first-out memory and issues a read-burst-transfer permitting request to the bus master interface unit, detects a data-absence state from the primary-bus reception first-in first-out memory and issues a read-burst-transfer stopping request to the bus master interface unit, detects a data-full state from the primary-bus transmission first-in first-out memory and issues a write-burst-transfer stopping request to the bus master interface unit, and detects a state other than the data full state from the primary-bus transmission first-in first-out memory and issues a write-burst-transfer permitting request to the bus master interface unit; and
    the bus master interface unit detects a data-presence state of the secondary-bus reception first-in first-out memory and a write-burst permitting request of the bus slave interface unit and executes write burst transfer, detects a data-absence state of the secondary-bus reception first-in first-out memory or a write-burst stopping request of the bus slave interface unit and stops the write burst transfer, detects a data-full state of the secondary-bus transmission first-in first-out memory or a read-burst stopping request of the bus slave interface unit and stops read burst transfer, and detects a state other than the data full state of the secondary-bus transmission first-in first-out memory and a read-burst-transfer permitting request of the bus slave interface unit and executes the read burst transfer.

4. A bus-protocol converting method comprising the steps of:
    causing command detecting means to detect a command sent from an external-memory control device, connected to a primary bus, to a primary-bus interface controller and causing command converting means to convert the detected command into a command to be sent from a secondary-bus interface controller to an external memory device through a secondary bus;
    causing status detecting means to detect a status sent from the external memory device connected to the secondary bus and causing status converting means to convert the detected status into a status to be sent from the primary-bus interface controller to the external-memory control device through the primary bus;
    using, when a data transfer controller that is provided between the primary-bus interface controller and the secondary-bus interface controller performs data transfer between the external-memory control device, connected to the primary bus, and the external memory device, connected to the secondary bus, through a direct-memory-access bus, a first-in first-out memory included as a communication buffer in the primary-bus interface controller, assigning the ring buffer as a virtual memory, directly sending a value of a data transfer size from the external-memory control device to the secondary bus interface controller, executing a bus master direct-memory-access operation once between the secondary-bus interface controller and the virtual memory, and performing bus-protocol-conversion data transfer simultaneously with the execution of the bus master direct-memory-access operation.

5. The bus-protocol converting method according to claim 4, further comprising the steps of:
    causing a bus slave interface unit that is included in the data transfer controller to map a primary-bus reception first-in first-out memory and a primary-bus transmission first-in first-out memory, included as the communication buffer in the primary-bus interface controller, into the same contiguous address space independently from an address space of a central processing unit, wherein the bus slave interface unit has a direct-memory-access address space having, as an upper-limit address, an external memory size stored in external-memory-size obtaining means, and causing the bus slave interface unit to transmit the external memory size to the external-memory control device via the primary-bus interface controller; and
    causing a bus master interface unit included in the data transfer controller to obtain a transfer address and a transfer size from a secondary-bus command generating means included in the secondary-bus interface controller and to perform burst transfer between the secondary bus and the direct-memory-access bus.

6. The bus-protocol converting device according to claim 4, further comprising the steps of:
   causing a bus slave interface unit included in the data transfer controller to perform data transfer between the primary bus and the direct-memory-access bus and causing a bus master interface unit included in the data transfer controller to perform burst transfer between the secondary bus and the direct-memory-access bus;
   causing the bus slave interface unit to detect a data-presence state from the primary-bus reception first-in first-out memory included as the communication buffer in the primary-bus interface controller and issue a read-burst-transfer permitting request to the bus master interface unit, to detect a data-absence state from the primary-bus reception first-in first-out memory and issue a read-burst-transfer stopping request to the bus master interface unit, to detect a data-full state from the primary-bus transmission first-in first-out memory included in the communication buffer in the primary-bus interface controller and issue a write-burst-transfer stopping request to the bus master interface unit, and to detect a state other than the data full state from the primary-bus transmission first-in first-out memory and issue a write-burst-transfer permitting request to the bus master interface unit; and
   causing the bus master interface unit to detect a data-presence state of the secondary-bus reception first-in first-out memory included as a communication buffer in the secondary-bus interface controller and a write-burst permitting request of the bus slave interface unit and execute write burst transfer, to detect a data-absence state of the secondary-bus reception first-in first-out memory or a write-burst stopping request of the bus slave interface unit and stop the write burst transfer, to detect a data-full state of a secondary-bus transmission first-in first-out memory included as the communication buffer in the secondary-bus interface controller or a read-burst stopping request of the bus slave interface unit and stop read burst transfer, and to detect a state other than the data full state of the secondary-bus transmission first-in first-out memory and a read-burst-transfer permitting request of the bus slave interface unit and execute the read burst transfer.

7. A bus-protocol converting device comprising:
   a primary bus interface controller to which an external-memory control device is connected through a primary bus, the primary bus interface controller including a first-in first-out memory as a communication buffer;
   a secondary bus interface controller to which an external memory device is connected through a secondary bus;
   a command detecting unit configured to detect a command sent from the external-memory control device, connected to the primary bus, to the primary bus interface controller;
   a command converting unit configured to convert the command detected by the command detecting unit into a command to be sent from the secondary bus interface controller to the external memory device through the secondary bus;
   a status detecting unit configured to detect a status sent from the external memory device connected to the secondary bus;
   a status converting unit configured to convert the status detected by the status detecting unit into a status to be sent from the primary-bus interface controller to the external-memory control device through the primary bus; and
   a data transfer controller that is provided between the primary bus interface controller and the secondary bus interface controller to perform data transfer between the external-memory control device, connected to the primary bus, and the external memory device, connected to the secondary bus, through a direct-memory-access bus;
   wherein the data transfer controller uses the first-in first-out memory in a ring buffer, assigns the ring buffer as a virtual memory, directly sends a value of a data transfer size from the external-memory control device to the secondary bus interface controller, executes a bus master direct-memory-access operation once between the secondary-bus interface controller and the virtual memory, and performs bus-protocol-conversion data transfer simultaneously with the execution of the bus master direct-memory-access operation.

* * * * *